United States Patent
Aronica et al.

[15] 3,671,632
[45] June 20, 1972

[54] INSECTICIDAL COMPOSITIONS OF ENDOSULFAN IN FENITROTHION FOR U.L.V. TREATMENT

[72] Inventors: Claude S. Aronica, Ecully; Louis Moulin, Tassin La Demi Lune, both of France

[73] Assignee: Pechiney-Progil, Lyon, France

[22] Filed: Sept. 15, 1969

[21] Appl. No.: 858,108

[30] Foreign Application Priority Data

Sept. 16, 1968 France..................................6850388

[52] U.S. Cl..............................................424/218, 424/276
[51] Int. Cl..........................................A01n 9/36, A01n 9/28
[58] Field of Search..........................................424/276, 218

[56] References Cited

UNITED STATES PATENTS 3,078,278  2/1963  Geering et al. ........................424/276

Primary Examiner—Sam Rosen
Attorney—Robert E. Burns and Emmanuel J. Lobato

[57] ABSTRACT

A composition comprising a solution of endosulfan in fenitrothion is used to control insect parasites on plants, particularly cotton plants. The composition is suitable for use in ultra low volume treatment of plants and may be sprayed from an aircraft.

3 Claims, No Drawings

INSECTICIDAL COMPOSITIONS OF ENDOSULFAN IN FENITROTHION FOR U.L.V. TREATMENT

The present invention relates to insectidal compositions having a high concentration of active principle, which compositions are particularly important for antiparisitic treatments using a very low volume of the composition. These treatments are known as U.L.V. (ultra low volume) treatments.

In conventional applications of agricultural pesticides, an active principle such as an insecticide, fungicide or herbicide is normally never used alone, but is used as a composition comprising the active principle mixed with one or more diluents to bring its concentration to a suitable strength taking into account the dose per unit area (e.g. hectare) desired and the rate of application of the composition by the appliances used.

To the diluted compositions are normally added additives such as surface active agents, wetting agents, adhesives, deflocculants and anti-lump forming agents to facilitate the use of the composition.

Normally, before use, these compositions are diluted with water to a suitable concentration for their use.

The inventor has discovered that 0,0-dimethyl-0-(4-nitro-m-tolyl phosphorothioate (fenitrothion) is an excellent solvent for endosulfan (the AFNOR standardized name of 6, 7, 8, 9, 10, 10-hexachloro -1, 5, 5*a*, 6, 9, 9*a*-hexahydro -6, 9, methano-2, 4, 3-benzodioxathiepin-3-oxide).

This solubility is as follows (in parts by weight)

at 10°: 30–35 at 20°: 35–40 at 30°: 40–45

Endosulfan is an extremely important insecticide in the fight against cotton parasites and cotton itself is very suitable for U.L.V. treatments, mainly by aircraft, because of the extent of the surfaces to be treated and of the frequent lack of water near the surfaces to be treated.

The finding of this unexpected solubility offers considerable interest.

A composition with an endosulfan base may be made up sufficiently concentrated in its active principles to be used in U.L.V. treatment and having a sufficiently broad spectrum to control all of the normal insect parasites of cotton, as will be seen from table 1 below:

TABLE 1

| Product used and dose of active principle | Destruction percentage of the principal parasites of cotton | | | | | | | | | |
|---|---|---|---|---|---|---|---|---|---|---|
| | Aphis | Thrips | Jassides | Bemisia | Heliothis | Earias | Prodenia | Laphygma | Platyedra | Diparopsis |
| Endosulfan, 1 litre/hectare | 80 | 80 | 100 | 70 | 90 | 90 | 50 | 80 | 40 | 70 |
| Endosulfan plus fenitrothion, 1 litre/hectare | 100 | 100 | 100 | 100 | 100 | 100 | 100 | 100 | 100 | 100 |

*n.b: Composition 350 endosulfan, 700 fenitrothion (in parts by weight).

This type of composition is very satisfactory when conventional treatments are carried out, in which treatments the quantities of diluted composition applied per unit of surface are considerable, e.g. 20 to 1,000 liters per hectare.

However, generally, it is economically more important to supply special agents in as concentrated a form as possible. For a given pesticidal power the greater are the economics in packing (packaging), storage and transport which are achieved, that is to say on all the expenses that are proportional to the weight of the special agents and not to the weight of the active material.

Furthermore, when U.L.V. treatments have to be made where the quantities of the composition applied per unit of surface are very low (0.5 liters per hectare) it is necessary to use extremely concentrated compositions since the total volume to be applied per hectare practically corresponds to the active material necessary to obtain good destruction of insects.

If the active material itself is a liquid, the problem is relatively simple, since it suffices to use it alone, normally as the technically pure compound or with a very small quantity of additives.

It is because of this that malathion (dithiophosphate of 0.0-dimethyl-S - (1, 2-dicarbethoxyethyl) ) is very widely used in U.L.V.

On the other hand, if solid active principles have to be applied the preparation of compositions which are usable in U.L.V. is more complicated, since it is necessary to find solvents in which the active principle has a very high solubility to obtain the required high concentrations, which have a low volatility to avoid their evaporation before their arrival on the culture, which are non-phytotoxic, which are of low initial cost and which have a low inflammability so as to be usable in aerial treatments.

The invention resides in the discovery of a compound which is both a solvent possessing the desirable properties defined above and an insecticide, and to thus obtain concentrated solutions of one insecticide in another insecticide, with a very considerable reduction in the quantities of any other additives required.

The results in the above table corresponds to trials made in open air. They demonstrate the considerable le practical interest of the invention compositions.

It is clear, that by a synergistic phenomenon, the compounds, endosulfan and fenitrothion mutually activate each other and exercise, when the are used together, an insecticidal action very superior to that each of the compounds used individually.

Even if, first sight, this superiority of action does not give the full import in figures, the spectacular differences, on the other hand, in the practical plane, these differences are of capital interest.

For example, for parasites such as *Heliothis sp.*, an incomplete destruction thereof is of a limited practical interest, since a single caterpillar of this species is capable of destroying about 50 floral buds in one day.

It will therefore be seen that the difference between a treatment resulting in 90 percent mortality and a treatment having given total mortality, is very important.

For the practical use of the inventive compositions there may be added to the mixture of active materials small quantities of additives mainly to improve the physical properties, such as fluidity and adherence of the composition of products intended to reduce the surface tension of the composition. It may also be advantageous to add a small quantity of stabilizer to the composition.

It is thus that the composition used by the applicant for trials the results of which have been given above, had the following composition (in parts by weight).

| | |
|---|---|
| Technical Endosulfan | 350 |
| Technical Fenitrothion | 700 |
| Solvantar 400 (1) | 100 |
| Epichlorhydrin (2) | 10 |
| and sufficient Dutrex V.2 (3) | 130 |
| Total | 1,290 | to make the composition up to 1 liter, that is about 1,000 c.c. of a solution of a density 1.3.

1. Solvantar 400 is an aromatic petroleum solvent sold by Messrs. Antar

2. Epichlorhydrin is stabilizer for endosulfan respective percentages of the active materials or the quantities of
3. aromatic petroleum solvent of Shell This formulation is only given by way of an indication, it being quite evident that it is possible, as a function of the exact nature of the parasitism presents, as well as of the volume to be applied per hectare (a function itself of the treatment appliance used) to modify, either the quantities of the solvents used.

Of course it is evident, in fact, that the efficacy of the treatment being substantially conditioned by the quantity/hectare of the active material applied, the solution will be different depending on whether the treatment appliance is provided to apply 0.5 or 5 l/Ha.

Furthermore, if in the above-mentioned composition all or part of the Dutrex is replaced by one or more appropriate surface active agents, there will be obtained emulsifiable compositions which may be used for U.L.V. treatments, or as an aqueous emulsion for conventional treatments.

It is also clear that, if in the zones to be treated the dominant parasite is composed of *Platyedra* and *Prodenia* for example (species which are more sensitive to fenitrothion than to endosulfan), it is desirable to use compositions more concentrated in fenitrothion and less concentrated in endosulfan, for example:

endosulfan: 100 parts by weight
fenitrothion: 900 parts by weight

In a general way, the compositions in accordance with the invention could contain 1 part of endosulfan to 1 to 10 parts of fenitrothion.

It is also possible to add to the compositions in accordance with the invention, other insecticidal compounds and mainly other phosphoric esters, such as for example parathion or other chlorinated insecticides such as D.D.T., H.C.H. or lindane. The addition of these other compounds may necessitate the use of a third solvent in sufficient quantity.

What is claimed is:

1. A liquid insecticidal composition containing as an active ingredient a solution of 1 part by weight of endosulfan in 1 to 10 parts by weight of fenitrothion.

2. A process for the treatment of substrates susceptible to insecticidal attach which process comprises applying thereto a composition comprising a solution of 1 part by weight of endosulfan in 1 to 10 parts by weight of fenitrothion.

3. A process for the treatment of cotton plants which process comprises applying thereto from an aircraft a solution of 1 part by weight of endosulfan in 1 to 10 parts by weight of fenitrothion.

* * * * *